(12) United States Patent
Sano

(10) Patent No.: US 8,373,930 B2
(45) Date of Patent: Feb. 12, 2013

(54) REFLECTION SUPPRESSION ELEMENT AND OPTICAL APPARATUS

(75) Inventor: Daisuke Sano, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 841 days.

(21) Appl. No.: 12/546,949

(22) Filed: Aug. 25, 2009

(65) Prior Publication Data

US 2010/0053757 A1   Mar. 4, 2010

(30) Foreign Application Priority Data

Aug. 29, 2008 (JP) ................. 2008-222900

(51) Int. Cl.
*G02B 1/10* (2006.01)

(52) U.S. Cl. ...................................................... 359/586

(58) Field of Classification Search .............. 359/566, 359/569, 570, 574, 576, 577, 580, 581, 586, 359/588, 589, 590; 428/162, 435, 430, 451, 428/473.5

See application file for complete search history.

(56) References Cited

U.S. PATENT DOCUMENTS

| 7,297,386 | B2 | 11/2007 | Suzuki et al. | |
|---|---|---|---|---|
| 2010/0067111 | A1* | 3/2010 | Sano et al. | 359/488 |
| 2010/0118404 | A1* | 5/2010 | Endoh et al. | 359/569 |
| 2010/0296168 | A1* | 11/2010 | Sano | 359/586 |

FOREIGN PATENT DOCUMENTS

| JP | 61-051283 A | 11/1986 |
|---|---|---|
| JP | 2003-240904 A | 8/2003 |
| JP | 2005-062674 A | 3/2005 |

* cited by examiner

*Primary Examiner* — Arnel C Lavarias
*Assistant Examiner* — Tamara Y Washington
(74) *Attorney, Agent, or Firm* — Carter, DeLuca, Farrell & Schmidt LLP

(57) ABSTRACT

The optical element includes a base member, and a first layer which is formed on the base member and whose refractive index for a central use wavelength λ changes in a thickness direction of the first layer by 0.05 or more. The first layer has an anti-reflection function and satisfies $n_t=n_{i+0.1(ns-n_t)}$, $0.5 \leq [n\{t(n_t)/2\} - n_t]/[n_s - n\{t(n_t)/2\}] \leq 0.8$, $\lambda/4 \leq t(n_t) \leq 2\lambda$ and $1.0 \leq n_{t \leq 1.1}$. $n_i$ represents a refractive index of a most light entrance side part of the first layer for the central use wavelength, $n_s$ represents a refractive index of a most base member side part of the first layer for the central use wavelength, $t(n_t)$ represents an optical film thickness of the first layer at which the refractive index thereof for the central use wavelength is $n_t$, and $n\{t(n_t)/2\}$ represents a refractive index of the first layer for the central use wavelength at a position where the optical film thickness ism $t(n_t)/2$.

6 Claims, 15 Drawing Sheets

REFLECTION SUPPRESSION ELEMENT AND OPTICAL APPARATUS

BACKGROUND OF THE INVENTION

The present invention relates to an optical element provided with a structure having a reflection suppressing effect (anti-reflection function), and to an optical apparatus including the optical element.

In general, on at least one surface of an optical element formed of a transparent member, a thin film having an anti-reflection function is formed by using a film forming method typified by vapor deposition and sputtering. However, such a film forming method limits materials that can be used for film formation, which makes it difficult to obtain a thin film having an arbitrary refractive index.

Japanese Examined patent publication No. 61-51283 discloses a method for virtually obtaining a thin film having an intermediate refractive index by selectively introducing a thin film having a high refractive index and a thin film having a low refractive index and by appropriately setting thicknesses of the introduced thin films.

Further, another method forms an anti-reflection structure constituted by plural structure portions (protrusions) each smaller than a use wavelength (that is, a wavelength of light entering the optical element) on at least one surface of an optical element. The most famous anti-reflection structure is a moth-eye structure. A surface of the moth-eye structure provides a very low reflectance due to a microstructure unique to the moth-eye structure.

In a microstructure whose each structure portion is smaller than the use wavelength, light of the use wavelength cannot recognize the microstructure and therefore behaves as if entering a uniform medium. The microstructure has a refractive index according to a volume ratio of a material forming the microstructure. The use of this can realize a microstructure having a low refractive index that cannot be obtained by using normal materials. The use of such a low refractive index microstructure can achieve a higher performance anti-reflection function.

Japanese Patent Laid-Open No. 2005-62674 discloses an anti-reflection structure formed by the above-described microstructure in which protrusions have a tapered shape toward a surface side (light entrance side). In such an anti-reflection structure, a refractive index gradually reduces from a base member side of an optical element toward the surface side thereof.

Japanese Patent Laid-Open No. 2003-240904 discloses a microstructure constituted by plural protrusions each having a shape in which, in comparison of a most convex portion and a most concave portion of the protrusion, the most convex portion is sharper than the most concave portion. Such a shape of the protrusion makes change in refractive index at a superficial surface part or a boundary part between the microstructure and the base member more gently, which reduces the reflectance of the microstructure.

However, the film virtually having the intermediate refractive index disclosed in Japanese Examined patent publication No. 61-51283 is inferior in a broadband characteristic since the film is formed by using a high refractive index material.

Japanese Patent Laid-Open No. 2005-62674 does not disclose an optimal refractive index structure though it discloses a microstructure formed so as to be tapered in order to gradually change the refractive index.

Further, the microstructure disclosed in Japanese Patent Laid-Open No. 2003-240904 is focused only on the change of the refractive index at a boundary surface, which generates a part where the refractive index greatly changes, and therefore a good broadband characteristic cannot be obtained.

Thus, the film disclosed in Japanese Examined patent publication No. 61-51283 and the microstructures disclosed in Japanese Patent Laid-Open No. 2005-62674 and Japanese Patent Laid-Open No. 2003-240904 can realize an anti-reflection function under restricted conditions. However, the anti-reflection function is inferior in the broadband characteristic as well as in an incident angle characteristic.

SUMMARY OF THE INVENTION

The present invention provides an optical element having a reflection suppressing function (anti-reflection function) excellent in a broadband characteristic and an incident angle characteristic, and an optical apparatus including the optical element.

The present invention provides as one aspect thereof an optical element including a base member, and a first layer which is formed on the base member and whose refractive index for a central use wavelength λ changes in a direction of a thickness of the first layer by 0.05 or more. The first layer has an anti-reflection function and satisfies the following conditions:

$$n_t = n_i + 0.1 \cdot (n_s - n_i)$$

$$0.5 \leq \frac{n\{t(n_t)/2\} - n_t}{n_s - n\{t(n_t)/2\}} \leq 0.8$$

$$\frac{\lambda}{4} \leq t(n_t) \leq 2\lambda$$

$$1.0 \leq n_i \leq 1.1$$

where $n_i$ represents a refractive index of a most light entrance side part of the first layer for the central use wavelength, $n_s$ represents a refractive index of a most base member side part of the first layer for the central use wavelength, $t(n_t)$ represents an optical film thickness of the first layer at which the refractive index thereof for the central use wavelength is $n_t$, and $n\{t(n_t)/2\}$ represents a refractive index of the first layer for the central use wavelength at a position where the optical film thickness is $t(n_t)/2$.

The present invention provides as another aspect thereof an optical apparatus including the above-described optical element.

Other aspects of the present invention will become apparent from the following description and the attached drawings.

DESCRIPTION OF THE EMBODIMENTS

Exemplary embodiments of the present invention will be described hereinafter with reference to the accompanying drawings.

First, description will be made of common matters to embodiments (Embodiments 1 to 6) described below before specific description thereof.

Each embodiment describes an example in which a use wavelength range is 400 to 700 nm or 300 to 1000 nm and a central wavelength thereof (hereinafter referred to as central use wavelength) is 550 nm or 650 nm. However, the use wavelength range and the central use wavelength are not limited to the above wavelength range and wavelength, and may be other wavelength range and wavelength.

Figure 2:
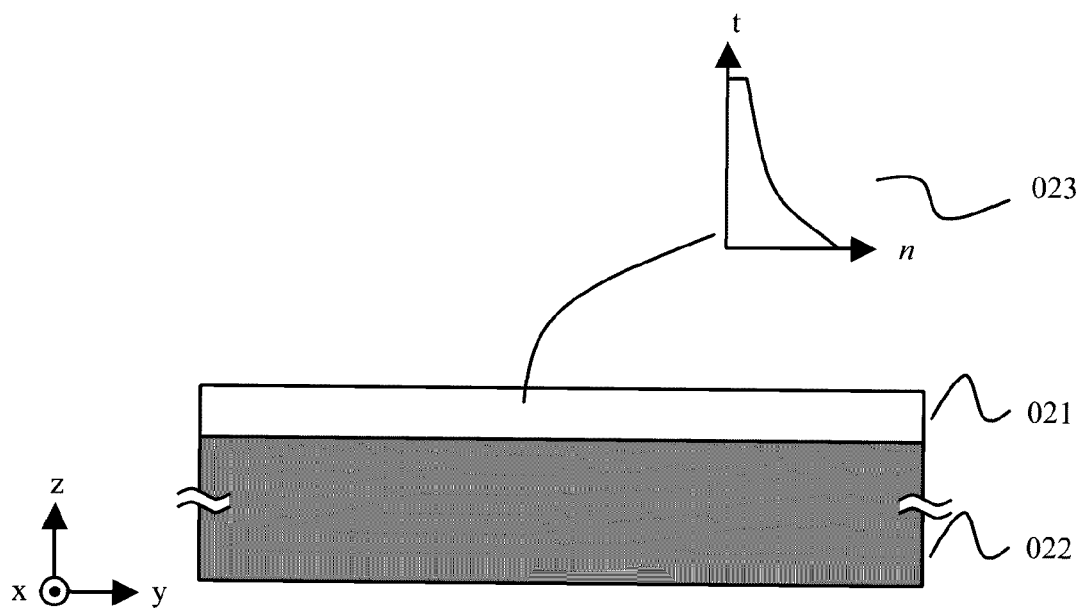
FIG. 2 shows a basic structure of an optical element of each embodiment.

FIG. 2 shows a basic configuration common to optical elements of Embodiment 1 to 6. Reference numeral 021 denotes a-first layer, which is hereinafter referred to as "graded layer". The graded layer means a layer whose refractive index changes in a z-direction that is a thickness direction of the layer (also referred to as "layer thickness direction" or "film thickness direction"). The graded layer 021 has a reflection suppressing function (in other words, an anti-reflection function).

Reference numeral 022 denotes a base member (base material) which corresponds to a main body (transmissive member) of the optical element including the graded layer 021. FIG. 2 shows a case where the graded layer 021 is formed on one surface of the base member 022. However, the graded layer 021 may be formed on both surfaces of the base member 022 (in other words, it is only necessary that the graded layer be formed on at least one surface of the base member).

Reference numeral 023 schematically shows a refractive index structure of the graded layer 021. A horizontal axis shows refractive index n of the graded layer 021, and a vertical axis shows optical film thickness t of the graded layer 021.

Figure 1:
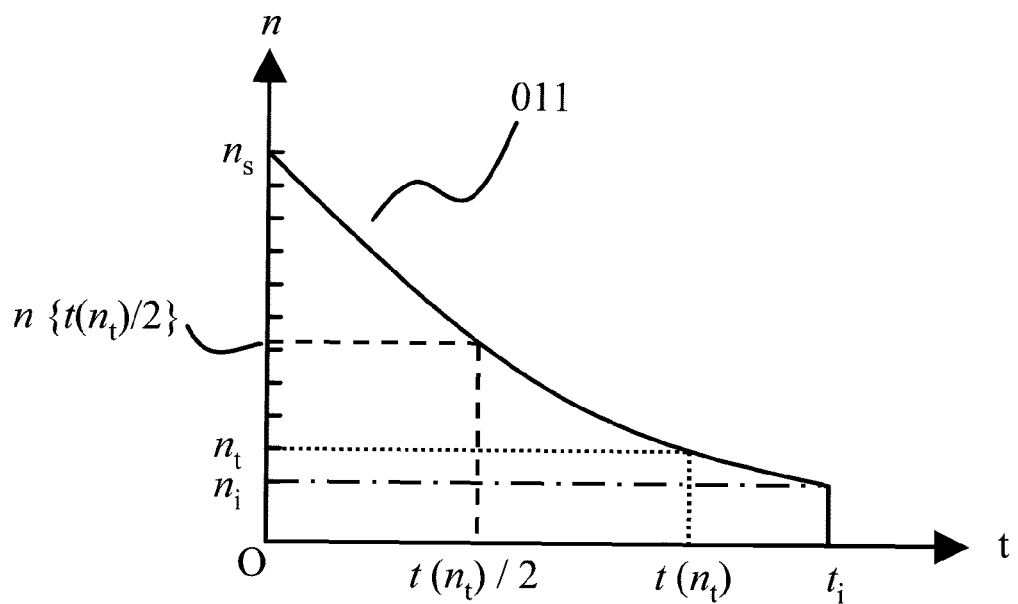
FIG. 1 shows a refractive index structure of a graded layer in each embodiment of the present invention.

FIG. 1 shows the above-mentioned refractive index structure 023 in more detail. However, the refractive index structure shown in the FIG. 1 is rotated by 90 degrees with respect to that shown in FIG. 2. A horizontal axis in the FIG. 1 shows the optical film thickness t and a vertical axis therein shows the refractive index n. A solid line 011 shows change of the refractive index of the graded layer 021 with respect to the optical film thickness. In the horizontal axis showing the optical film thickness t, an origin O denotes a boundary surface between the base member 022 and the graded layer 021, and $t_t$ represents a total optical film thickness of the graded layer 021.

When viewed from a base member side, the refractive index n of the graded layer 021 changes from $n_s$ to $n_i$. $n_i$ represents a refractive index of a most surface side part (that is, a most superficial surface) of the graded layer 021 for the central use wavelength. The most surface side part of the graded layer 021 can be also said as a most light entrance side part. Moreover, $n_s$ represents a refractive index of a most base member side part of the graded layer 021 for the central use wavelength.

The refractive index of the graded layer 021 changes more gently in the light entrance side part thereof than in the base member side part thereof. This is the same in FIGS. 9, 11, 14, 17, 24 and 26 used later.

Each embodiment defines $n_r$ by using $n_s$ and $n_i$. $n_r$ is shown by the following expression (1).

$$n_r = n_i + 0.1 \cdot (n_s - n_i) \qquad (1)$$

Each embodiment satisfies a condition shown by the following expression (2):

$$0.5 \leq \frac{n\{t(n_r)/2\} - n_r}{n_s - n\{t(n_r)/2\}} \leq 0.8 \qquad (2)$$

where $t(n_r)$ represents an optical film thickness of the graded layer 021 at which the refractive index thereof for the central use wavelength is $n_r$, and $n\{t(n_r)/2\}$ represents a refractive index of the graded layer 021 for the central use wavelength at a position where the optical film thickness is $t(n_r)/2$.

The condition shown by the expression (2) relates to a degree of the change of the refractive index of the graded layer 021 from a part (position) where the optical film thickness is $t(n_r)$ to a part (position) where the optical film thickness is $t(n_r)/2$.

The anti-reflection function can be explained by interference of light waves. This is the same in the graded layer whose refractive index changes thereinside in its thickness direction.

In the explanation by the light wave interference, a change amount of the refractive index shows an amplitude of the light wave, and the optical film thickness shows a phase difference amount of the light waves.

Figure 3:
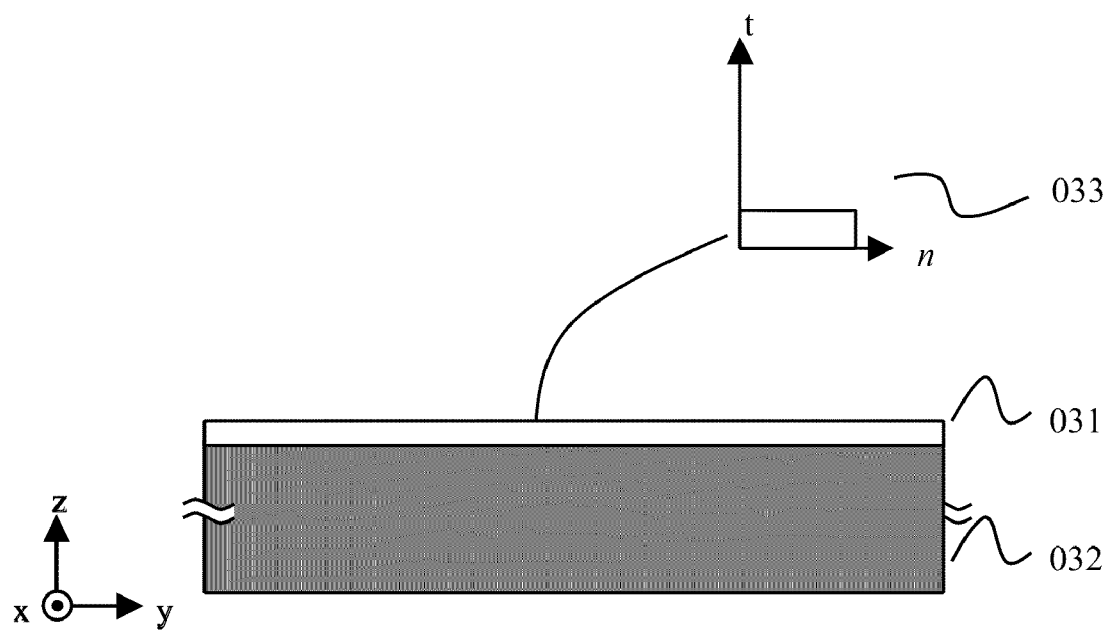
FIG. 3 shows a structure of an optical element in which a layer having a uniform refractive index is formed on a base member.

FIG. 3 shows an example of a layer having a uniform refractive index in the thickness direction. Reference numeral 032 denotes a base member, and reference numeral 031 denotes a thin film layer having a uniform refractive index in the thickness direction. Reference numeral 033 schematically shows a refractive index structure of the thin film layer 031.

Figure 4:
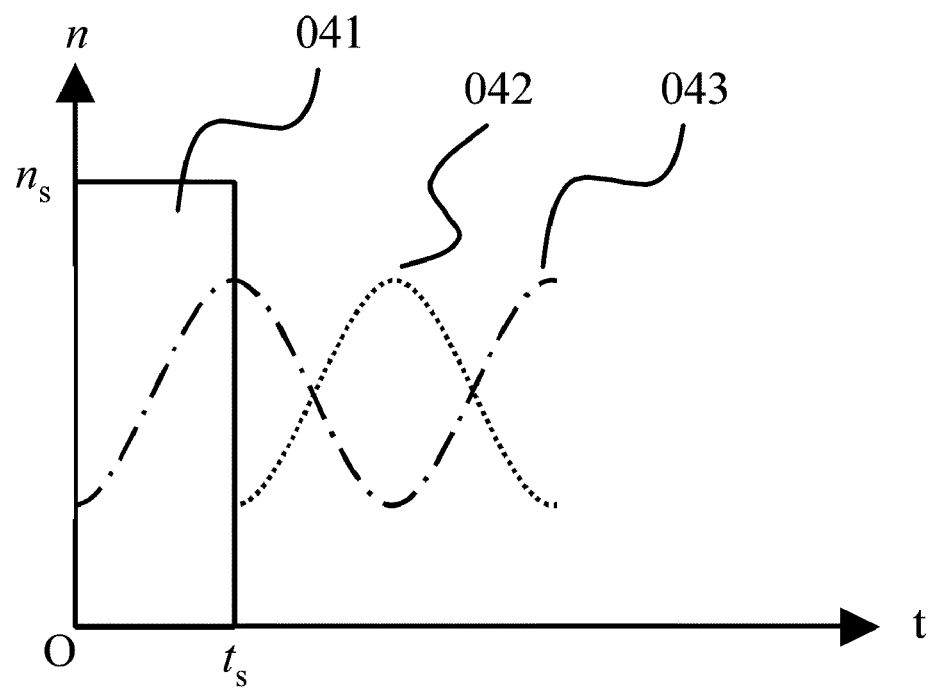
FIG. 4 shows a refractive index structure in a case where the uniform refractive index layer is formed on the base member.

FIG. 4 shows the above-mentioned refractive index structure 033 in more detail. However, the refractive index structure shown in the FIG. 4 is rotated by 90 degrees with respect to that shown in FIG. 3. A horizontal axis in FIG. 4 shows optical film thickness t and a vertical axis therein shows refractive index n. Reference numeral 041 denotes a refractive index and an optical film thickness of the thin film layer 031.

Reference numeral 042 shows a light wave reflected at a surface of the thin film layer 031, and reference numeral 043 shows a light wave reflected at a boundary surface between the thin film layer 031 and the base member 032. FIG. 4 shows interference of the light waves 042 and 043 when the optical film thickness $t_s$ of the thin film layer 031 is $\lambda/4$. In this case, the light waves 042 and 043 have a phase difference amount of about $\lambda/2$, thereby negating each other. As a result, the thin film layer 031 functions as an anti-reflection film.

Figure 5:
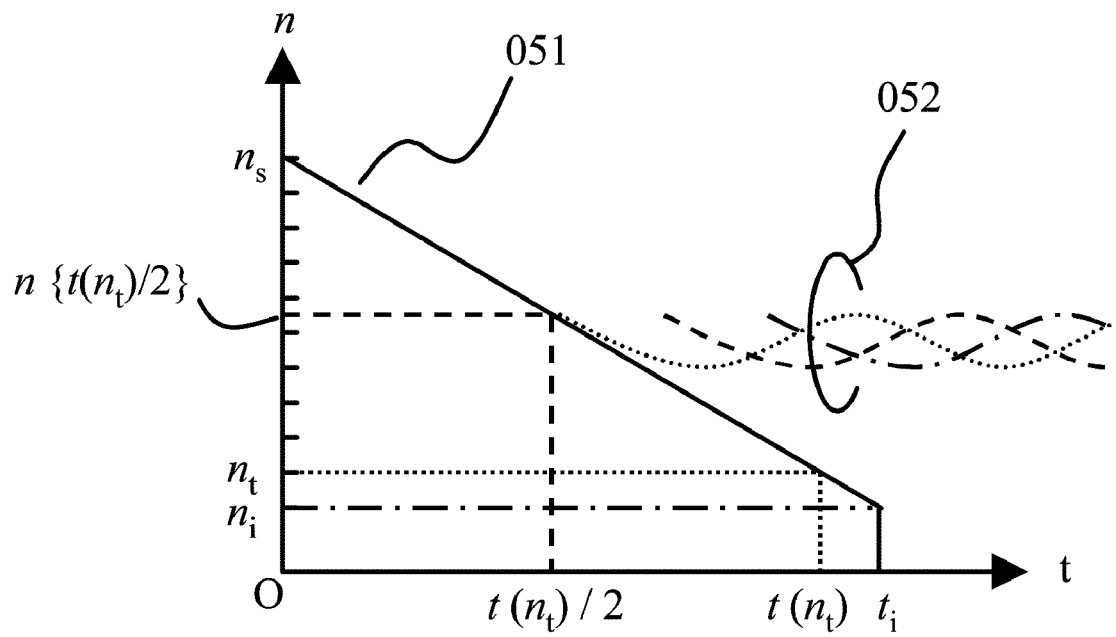
FIG. 5 shows a refractive index structure of a graded layer whose refractive index changes uniformly with respect to an optical film thickness.

On the other hand, FIG. 5 shows an example of a refractive index structure of an optical element having a graded layer. FIG. 5 shows a case where the refractive index uniformly changes with respect to the optical film thickness. Reference numeral 051 denotes the change of the refractive index with respect to the optical film thickness. Reference numeral 052 denotes part of light waves (reflected waves) reflected at respective positions on the graded layer.

Although the graded layer shown in FIG. 5 does not include a clear boundary surface, the light waves are reflected at respective parts where the refractive index changes. In other words, innumerable lights are reflected in the graded layer shown in FIG. 5, and the reflected waves 052 shown in FIG. 5 are part of the innumerable lights. An anti-reflection characteristic of such a graded layer is obtained by superposition of all reflected waves 052 from the respective optical film thicknesses.

Each embodiment makes it a condition that a difference between $n_s$ and $n_i$ is 0.05 or more, in other words, the refractive index of the graded layer for the central use wavelength changes by 0.05 or more in the thickness direction. This is a condition for providing the anti-reflection characteristic by the interference of the light waves in the graded layer.

Further, this condition also means that the refractive index greatly changes in the graded layer. The great change of the refractive index provides a great influence on a reflectance characteristic. Therefore, each embodiment is characterized by satisfying the conditions shown by the expressions (1) and (2).

In the expression (1), $n_t$ shows a value between the refractive indexes $n_s$ and $n_i$. The expression (2) shows a gradient of the refractive index between $n_t$ and $n_s$. The expression (2) means that the change of the refractive index $(n_s-n\{t(n_t)/2\})$ in a base member side part of the graded layer more inside than a surface side part thereof provides a greater influence on the light wave interference than the change of the refractive index $(n\{t(n_t)/2\}-n_t)$ in the surface side part.

Moreover each embodiment is characterized in that the optical film thickness $t(n_t)$ of the graded layer for the central use wavelength $\lambda$ satisfies a condition shown by the following expression (3):

$$\frac{\lambda}{4} \leq t(n_t) \leq 2\lambda \tag{3}$$

The optical film thickness $t(n_t)$ of the graded layer smaller than $\lambda/4$ does not cause sufficient light wave interference in the graded layer, so that the graded layer cannot function as an anti-reflection film. On the other hand, the optical film thickness $t(n_t)$ larger than $2\lambda$ makes it very difficult to form the graded layer shown in FIG. 5.

It is more preferable that the range of the expression (3) be a range from $\lambda/3$ to $3\lambda/2$ ($\lambda/3$ or more and $3\lambda/2$ or less). It is still more preferable that the range of the expression (3) be a range from $3\lambda/8$ to $5\lambda/4$ ($3\lambda/8$ or more and $5\lambda/4$ or less).

Furthermore, each embodiment is characterized by satisfying a condition shown by the following expression (4):

$$1.0 \leq n_i \leq 1.1 \tag{4}$$

When $n_i$ exceeds the upper limit of the expression (4), a difference between a refractive index of a tip end of the graded layer shown in FIG. 5 and that of air becomes large, and thereby light reflected at a boundary surface of the graded layer and the air increases. Therefore, it becomes difficult to reduce the reflectance in the entire wavelength range.

Figure 6:
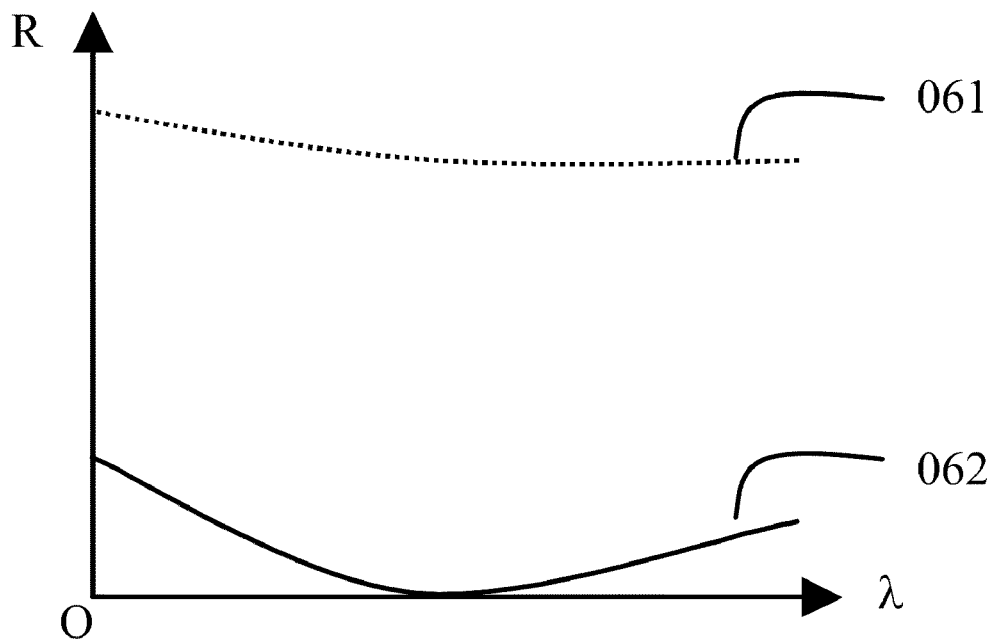
FIG. 6 shows a reflectance characteristic in a case where the graded layer shown in FIG. 5 is added to a base member.

FIG. 6 shows an example of a reflectance characteristic in a case where the graded layer shown in FIG. 5 is added to the base member. A horizontal axis shows wavelength $\lambda$ and a vertical axis shows reflectance R. Reference numeral 061 denotes a reflectance characteristic of only the base member, and reference numeral 062 denotes the reflectance characteristic in the case where the graded layer shown in FIG. 5 is added to the base member. The refractive index of the base member is $n_s$.

In the case shown in FIG. 6, the value of the expression (2) for the graded layer shown in FIG. 5 is 1.0, which does not satisfy the condition shown by the expression (2). In this reflectance characteristic, while the reflectance for a specific wavelength is almost 0, the reflectance in other wavelengths is increased.

Figure 7:
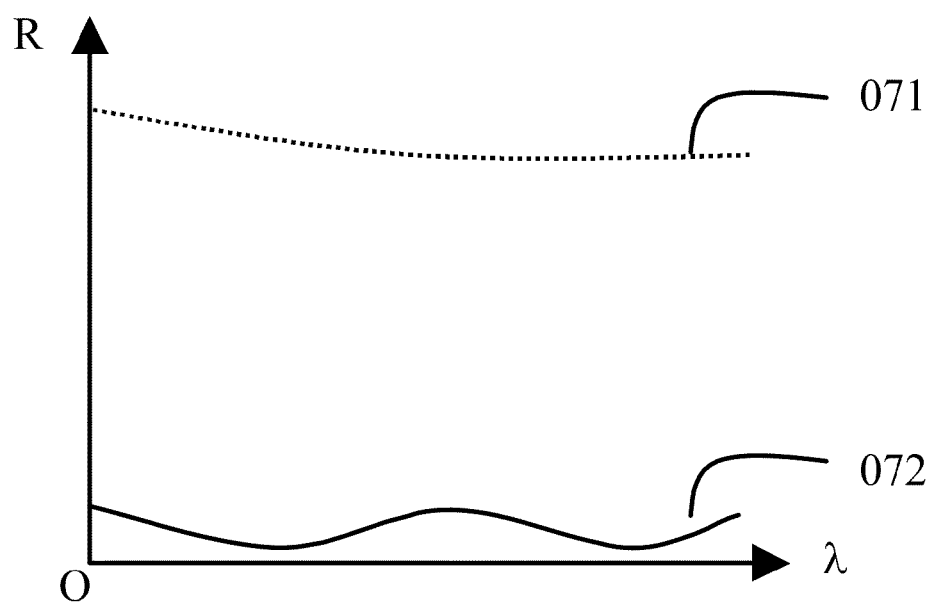
FIG. 7 shows a reflectance characteristic in a case where the graded layer shown in FIG. 1 is added to a base member.

On the other hand, FIG. 7 shows a reflectance characteristic in a case where the graded layer 021 shown in FIG. 2 is added to the base member. A horizontal axis shows wavelength $\lambda$ and a vertical axis shows reflectance R. Reference numeral 071 denotes a reflectance characteristic of only the base member, and reference numeral 072 denotes the reflectance characteristic in the case where the graded layer 021 is added to the base member. The refractive index of the base member is $n_s$.

In the case shown in FIG. 7, the value of the expression (2) for the graded layer 021 is 0.52, which satisfies the condition shown by the expression (2). The reflectance characteristic in this case has two minimum values, which shows that an extremely low reflectance is achieved in a broad wavelength range as compared with the reflectance characteristic shown in FIG. 6.

The satisfaction of the conditions shown by the expressions (1), (2), (3) and (4) enables acquisition of reflection suppressing performance (anti-reflection performance) with an excellent broadband characteristic.

On the other hand, when the value of the expression (2) is smaller than 0.5, the change of the refractive index in the base member side part of the graded layer further than the surface side part whose refractive index is low becomes large, which makes it difficult to reduce the reflectance. Further, it is difficult to obtain a W-letter shaped reflectance characteristic, so that the broadband characteristic is deteriorated. In addition, when the value of the expression (2) is 0.8 or more, the refractive index changes nearly linearly with respect to the optical film thickness, and therefore the broadband characteristic is deteriorated.

It is more preferable that the range of the value of the expression (2) be a range from 0.55 to 0.75 (0.55 or more and 0.75 or less). It is still more preferable that the range of the value of the expression (2) be a range from 0.58 to 0.7 (0.58 or more and 0.7 or less).

In order to add a high performance anti-reflection function to various glass materials having mutually different refractive indexes, it is necessary to adjust the refractive index of the graded layer so as to adapt it to the respective glass materials. Thus, in each embodiment, it is preferable to provide at least one optical interference layer between the base member that is a glass material and the graded layer to form a laminated structure by using the graded layer and the optical interference layer.

Adjusting a refractive index and a film thickness of the optical interference layer in such a laminated structure can realize a high performance anti-reflection laminated structure usable for various glass materials, without adjusting the refractive index of the graded layer.

Moreover, it is preferable that a refractive index of at least one of the above-described optical interference layer for the central use wavelength λ be a refractive index between the refractive index of the base member and $n_s$. This can realize a refractive index structure in which the refractive index gradually decreases from the base member to the most superficial surface of the graded layer. Such a refractive index structure prevents increase of light reflection caused due to oblique incidence of light, which makes it possible to obtain an anti-reflection laminated structure excellent in the broadband characteristic and an oblique incidence characteristic.

Figure 8:
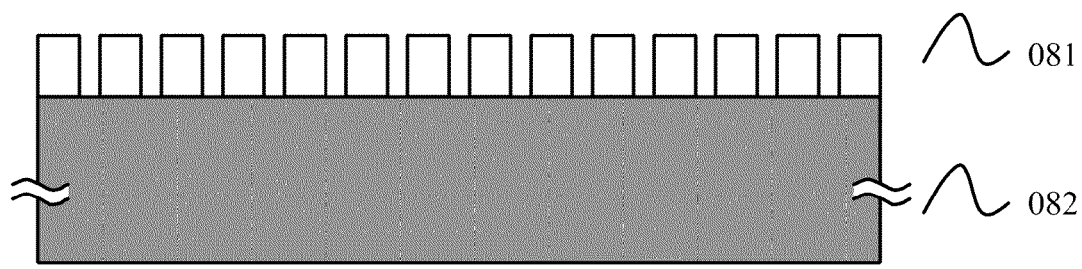
FIG. 8 shows a structure of an optical element in a case where a graded layer is formed as a microstructure layer in each embodiment.
Figure 9:
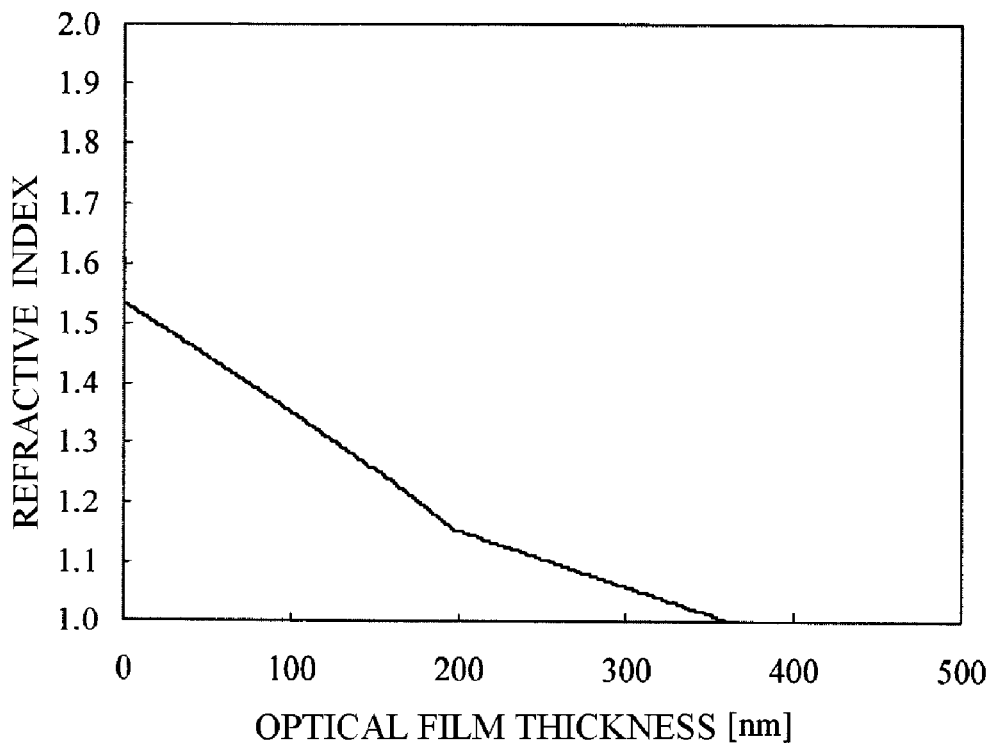
FIG. 9 shows a refractive index structure of a graded layer of Embodiment 1.

Furthermore, in each embodiment, it is preferable to form the graded layer into a microstructure layer constituted by plural structure portions each smaller than the central use wavelength λ. FIG. 8 shows an example of a structure in which such a microstructure layer is formed on the base member. Reference numeral 081 denotes the microstructure layer (graded layer), and reference numeral 082 denotes the base member.

In a microstructure whose each structure portion is sufficiently smaller than the central use wavelength λ, as described before, light entering the microstructure cannot recognize the microstructure itself and therefore behaves as if entering a homogeneous medium. In this case, the entering light shows a characteristic as if the microstructure is averaged.

An effective refractive index $n_e$ of the microstructure layer 081 is shown by the following expression (5):

$$n_e = \{ff \times n_m^2 + (1-ff)\}^{1/2} \quad (5)$$

where $n_m$ represents a refractive index of a material forming the microstructure, and ff represents a volume filling rate (filling factor) of the microstructure. This method for calculating the effective refractive index $n_e$ is called as a first-order effective refractive index method, and it is the easiest method for converting the microstructure (microstructure layer 081) into the effective refractive index.

On the other hand, the effective refractive index of the microstructure layer 081 changes depending on a pitch and a three-dimensional shape of the microstructure. For instance, in a case where $n_m$ is 2.3 and ff is 0.5, the effective refractive index $n_e$ calculated by the expression (5) is about 1.77. In contrast thereto, when an analysis is made by using a rigorous coupled wave analysis (RCWA) method on an assumption that the pitch of the microstructure changes from 80 nm to 150 nm, the effective refractive index $n_e$ changes from 1.73 to 1.79. Therefore, it is difficult to calculate the effective refractive index accurately from only a cross-sectional shape and ff of the microstructure.

Thus, each embodiment calculates change of the effective refractive index of the microstructure layer (graded layer) 081 with respect to its optical film thickness. Spectral ellipsometry is used as one of methods for calculating the effect refractive index. The spectral ellipsometry is a method in which irradiations of linearly polarized lights of mutually different wavelengths onto a specimen are performed to measure a ratio of polarized reflectances and a phase delay amount, and then a refractive index and film thickness model closest to the measurement results is calculated. This method makes it possible to confirm whether or not the microstructure satisfies the condition of the expression (2) even if details of the microstructure are unclear. If the expression (2) is satisfied, the graded layer may be a thin film layer and may be a microstructure layer.

Further, methods for obtaining the graded layer of each embodiment include a method in which a comparatively sparse film formed uniformly is soaked in a transparent sol-gel solution for a long time and then the soaked film is sintered, and a method in which, during film formation by a binary film forming method, a mixture ratio is gradually changed. If the graded layer satisfies the above-described refractive index conditions, the graded layer can be produced by any manufacturing process.

Figure 23:
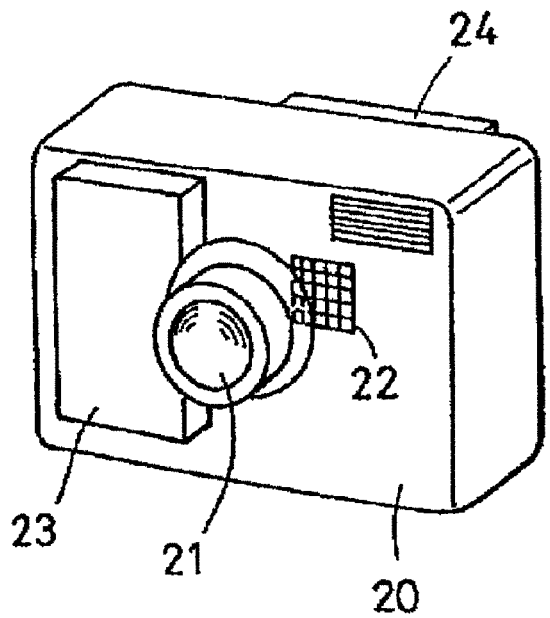
FIG. 23 schematically shows a digital camera using the optical element of each embodiment.
Figure 24:
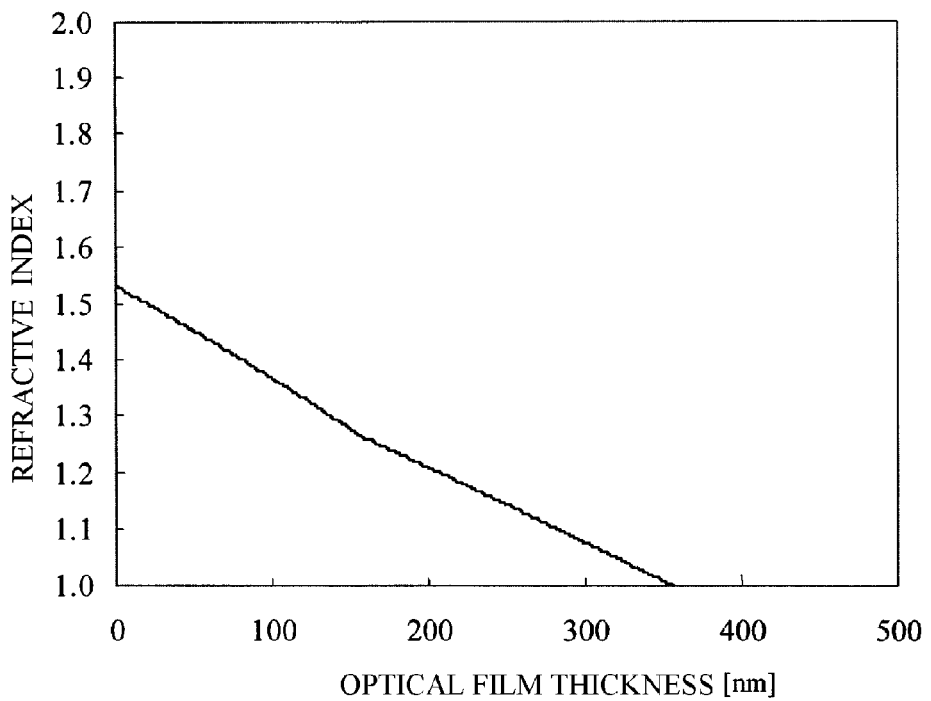
FIG. 24 shows a refractive index structure of a graded layer of Embodiment 5.

An optical element on which the above-described graded layer is formed can be used for various optical apparatuses. FIG. 23 shows a digital camera that is an optical apparatus using the optical element of each embodiment.

Reference numeral 20 denotes a camera body, and reference numeral 21 denotes an image-pickup optical system including a lens that is the optical element of each embodiment. The image-pickup optical system 21 includes plural lenses, and at least one thereof may be the optical element of each embodiment. Reference numeral 22 denotes a solid-state image pickup element (photoelectric conversion element) such as a CCD sensor or a CMOS sensor which receives an object image formed by the image-pickup optical system 21, the solid-state image-pickup element 22 being provided in a camera body 20. The solid-state image-pickup element 22 photoelectrically converts the object image to generate image information corresponding to the object image.

Reference numeral 23 denotes a memory that records therein the image information. Reference numeral 24 denotes an electronic viewfinder constituted by a liquid crystal display panel and the like, which enables observation of the image information (that is, the object image).

The image-pickup optical system thus constituted using the optical element of each embodiment can realize a camera that suppresses unnecessary reflection in the image-pickup optical system and thereby has high optical performance.

The optical element of each embodiment may also be used for a viewfinder optical system of a camera, an illumination optical system of a liquid crystal projector, a projection optical system thereof, and the like. The optical element having the above-described anti-reflection structure can sufficiently increase an amount of light being transmitted through the optical element and can well suppress generation of ghost or flare due to unnecessary reflection.

Hereinafter, Embodiments (simulation examples) 1 to 6 and Comparative Examples 1 to 3 will be described.

Embodiment 1

In Embodiment 1, S-BSM14 (glass) made by OHARA Co., Ltd was used as a base member. The refractive index thereof for the wavelength 650 nm was 1.6033. A graded layer having a refractive index structure shown in FIG. 9 was formed on the base member. $n_s$ was 1.530, $n_i$ was 1.0, and $t_i$ was 350 nm.

Figure 10:
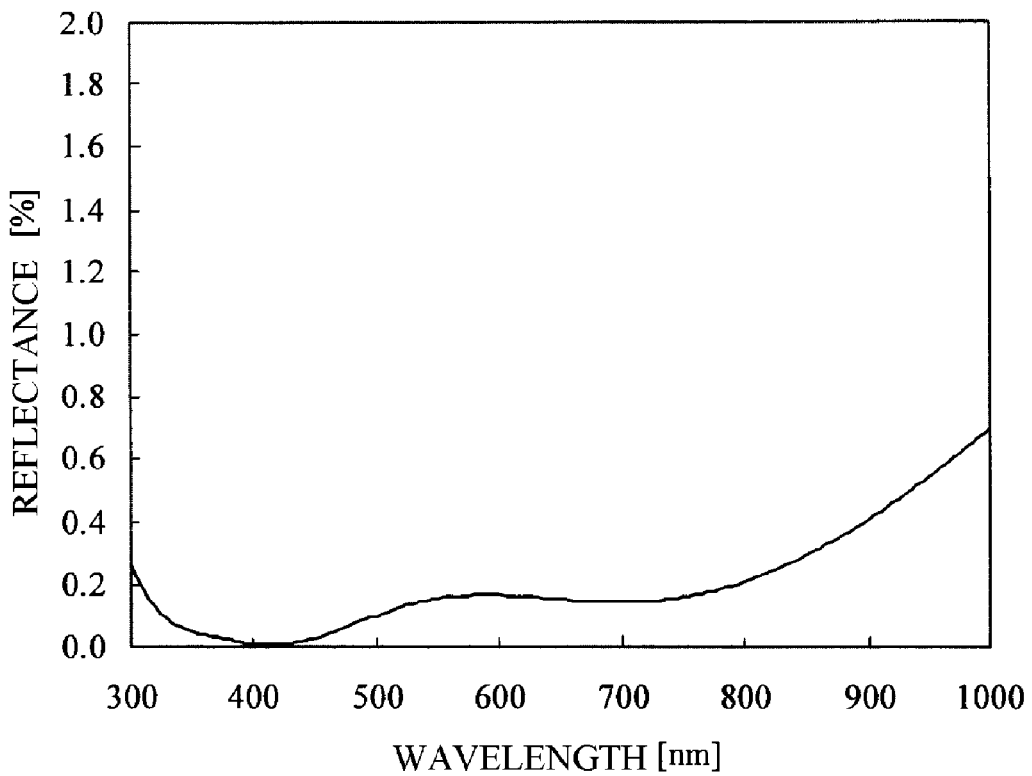
FIG. 10 shows a reflectance characteristic of Embodiment 1.
Figure 11:
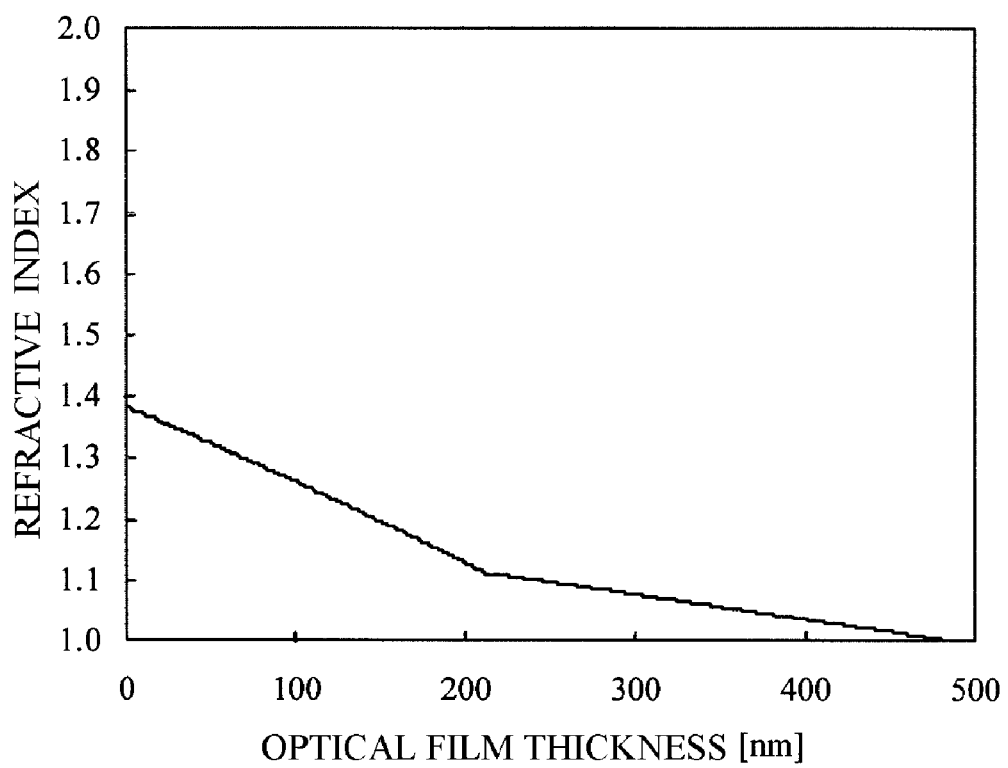
FIG. 11 shows a refractive index structure of a graded layer of Embodiment 2.

From the expression (1), $n_t$ was 1.053, and the value of the expression (2) was 0.72. FIG. 10 shows the reflectance characteristic of Embodiment 1. The reflectance characteristic included two minimum values, and a low reflectance of 0.2% or less was achieved in the entire visible wavelength range.

Embodiment 2

Figure 12:
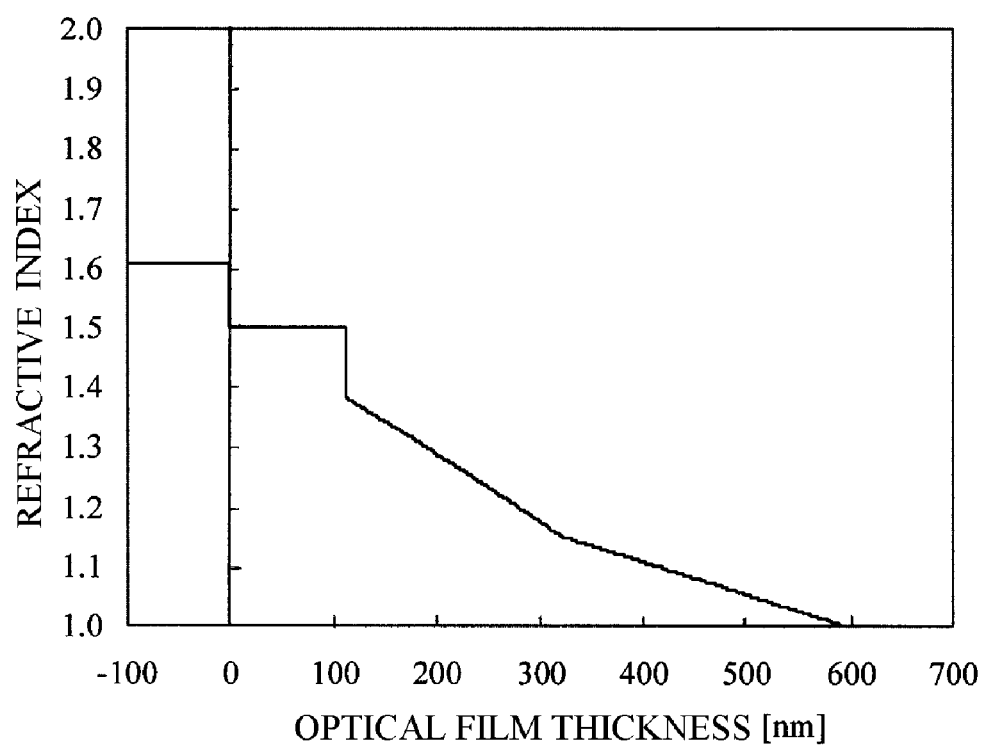
FIG. 12 shows a refractive index structure of an optical element of Embodiment 2.

In Embodiment 2, S-BSM14 made by OHARA Co., Ltd was used as a base member. The refractive index thereof for the wavelength 550 nm was 1.6088. An optical interference layer (refractive index: 1.50 and optical film thickness: 113 nm) was formed on the base member, and further a graded layer having a refractive index structure shown in FIG. 11 was formed on a surface of the base member. FIG. 12 shows the refractive index structure of the optical element of Embodiment 2. Part where the optical film thickness is negative shows the refractive index of the base member. $n_s$ was 1.38, $n_i$ was 1.0, and $t_i$ was 485 nm.

Figure 13:
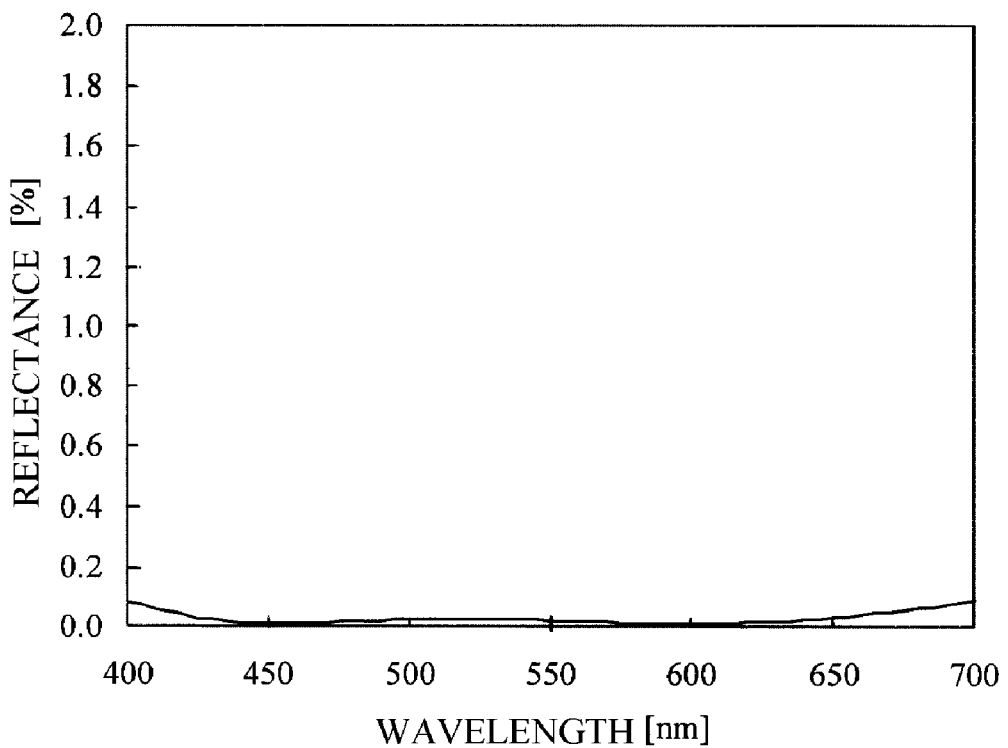
FIG. 13 shows a reflectance characteristic of Embodiment 2.
Figure 14:
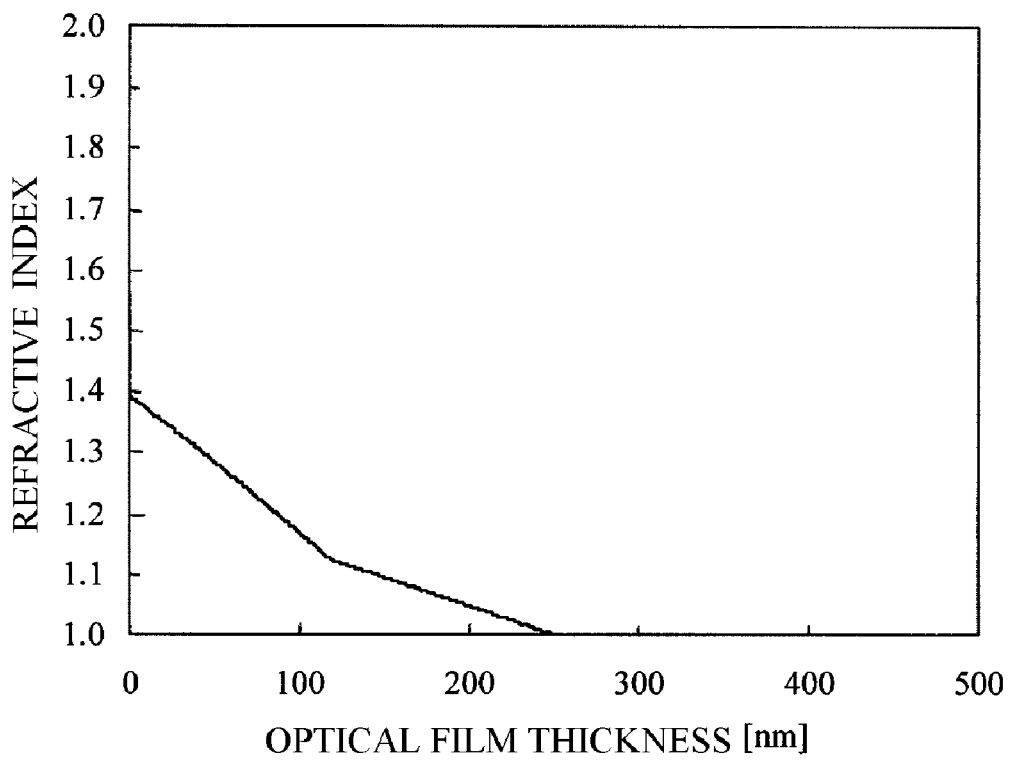
FIG. 14 shows a refractive index structure of a graded layer of Embodiment 3.

From the expression (1), $n_t$ was 1.038, and the value of the expression (2) was 0.50. FIG. 13 shows the reflectance characteristic of Embodiment 2. The reflectance characteristic included two minimum values, and a low reflectance of 0.1% or less was achieved in the entire visible wavelength range.

Embodiment 3

Figure 15:
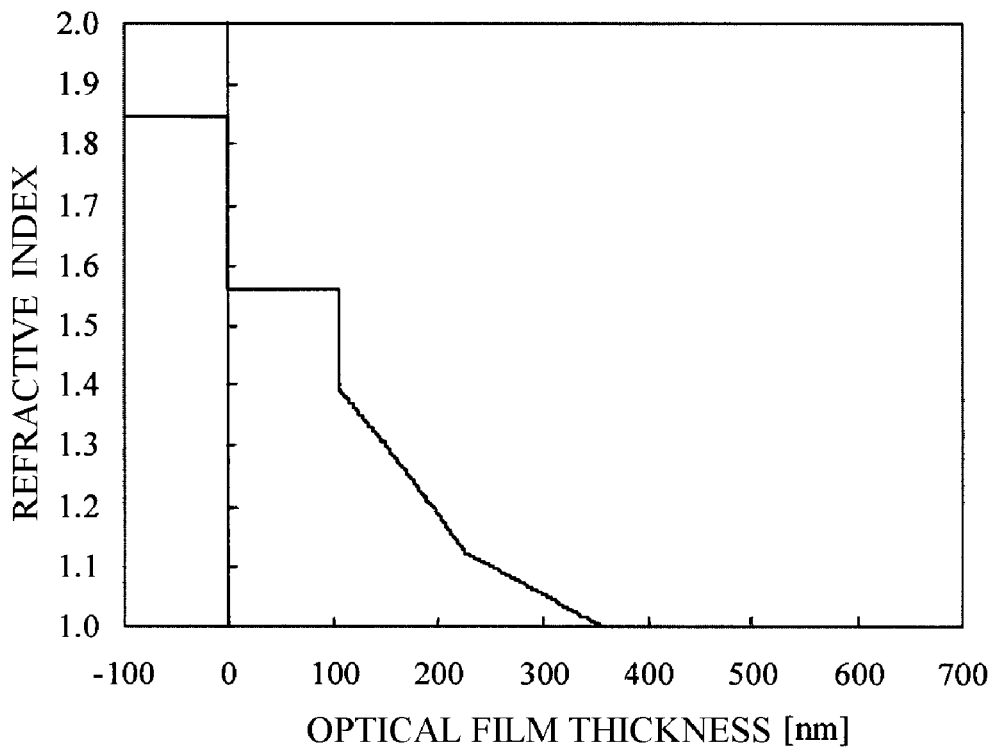
FIG. 15 shows a refractive index structure of an optical element of Embodiment 3.

In Embodiment 3, S-LAH55 (glass) made by OHARA Co., Ltd was used as a base member. The refractive index thereof for the wavelength 550 nm was 1.8390. An optical interference layer (refractive index: 1.56 and optical film thickness: 105 nm) was formed on the base member, and further a graded layer having a refractive index structure shown in FIG. 14 was formed on a surface of the base member. The graded layer was formed as a microstructure layer by first forming a thin film consisting primarily of aluminum oxide by a sol-gel method and then hydrothermally treating the thin film. This microstructure layer was analyzed with spectral ellipsometry. FIG. 15 shows the refractive index structure of the optical element of Embodiment 3. Part where the optical film thickness is negative shows the refractive index of the base member. $n_s$ was 1.39, $n_i$ was 1.0, and $t_i$ was 250 nm.

Figure 16:
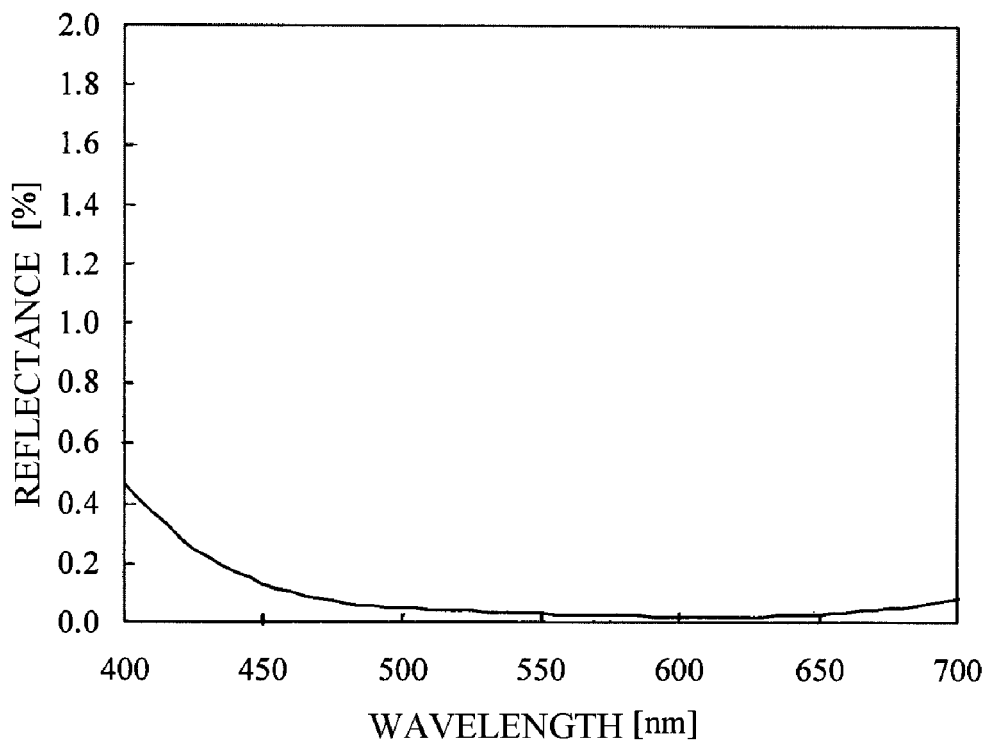
FIG. 16 shows a reflectance characteristic of Embodiment 3.
Figure 17:
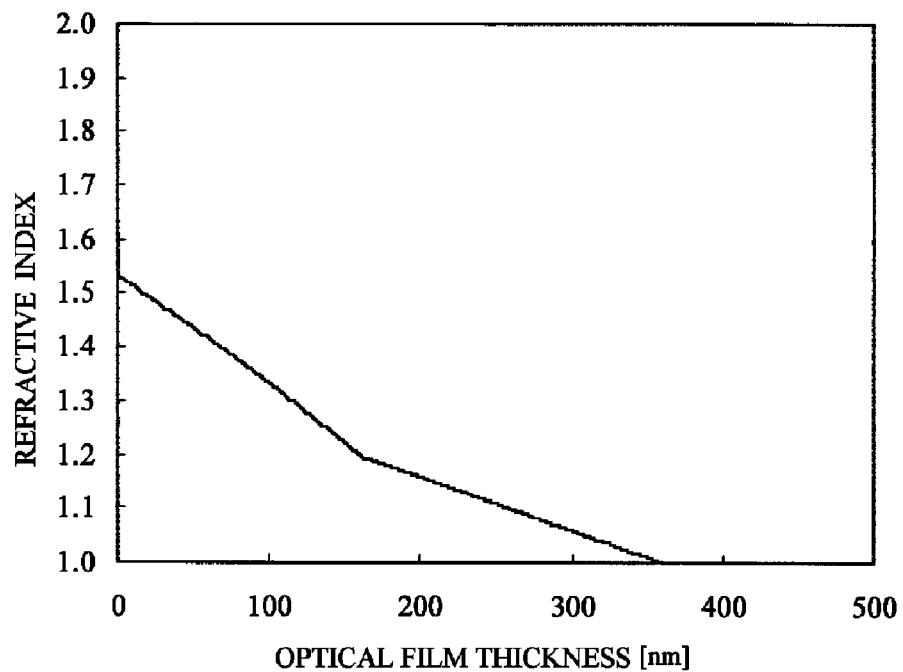
FIG. 17 shows a refractive index structure of a graded layer of Embodiment 4.

From the expression (1), $n_t$ was 1.039, and the value of the expression (2) was 0.53. FIG. 16 shows the reflectance characteristic of Embodiment 3. A low reflectance of 0.4% or less was achieved in the entire visible wavelength range.

Embodiment 4

In Embodiment 4, S-BSM14 made by OHARA Co., Ltd was used as a base member. The refractive index thereof for the wavelength 650 nm was 1.6033. A graded layer having a refractive index structure shown in FIG. 17 was formed on the base member. $n_s$ was 1.530, $n_i$ was 1.0, and $t_i$ was 350 nm.

Figure 18:
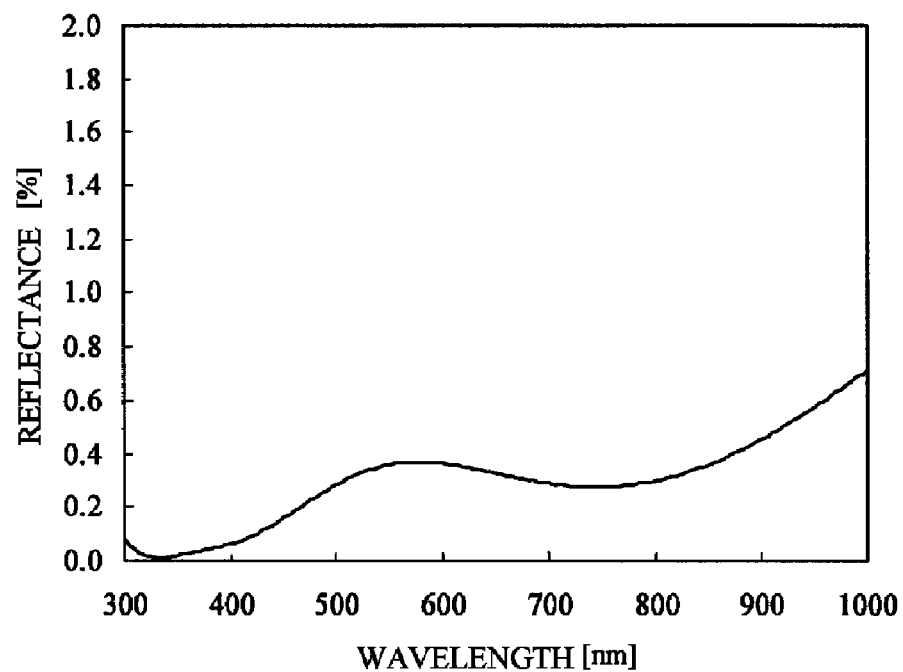
FIG. 18 shows a reflectance characteristic of Embodiment 4.

From the expression (1), $n_t$ was 1.053, and the value of the expression (2) was 0.51. FIG. 18 shows the reflectance characteristic of Embodiment 4. The reflectance characteristic included two minimum values, and a low reflectance of 0.4% or less was achieved in the entire visible wavelength range.

Embodiment 5

In Embodiment 5, S-BSM14 made by OHARA Co., Ltd was used as a base member. The refractive index thereof for the wavelength 650 nm was 1.6033. A graded layer having a refractive index structure shown in FIG. 24 was formed on the base member. $n_s$ was 1.530, $n_i$ was 1.0, and $t_i$ was 350 nm.

Figure 25:
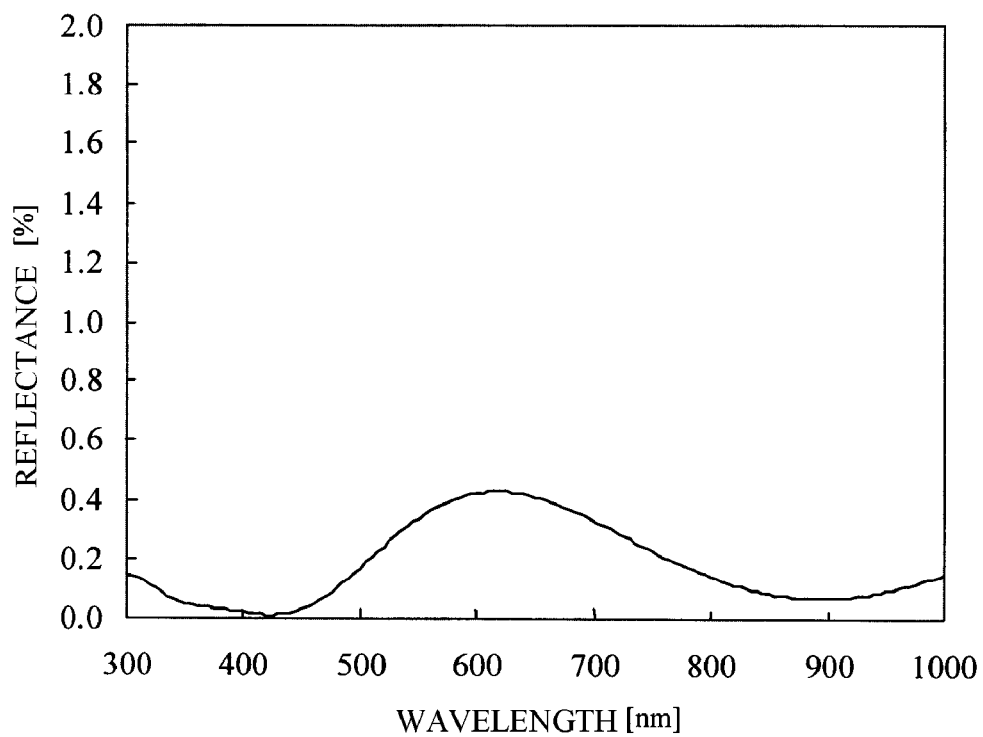
FIG. 25 shows a reflectance characteristic of Embodiment 5.
Figure 26:
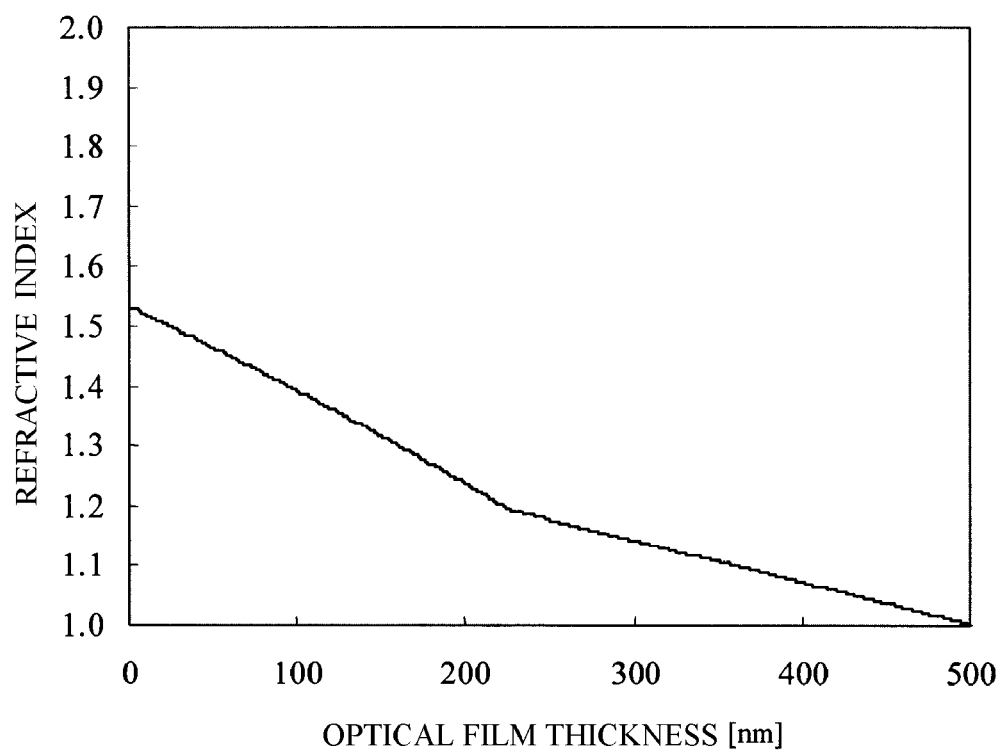
FIG. 26 shows a refractive index structure of a graded layer of Embodiment 6.

From the expression (1), $n_t$ was 1.053, and the value of the expression (2) was 0.78. FIG. 25 shows the reflectance characteristic of Embodiment 5. The reflectance characteristic included two minimum values, and a low reflectance of 0.5% or less was achieved in the entire visible wavelength range.

Embodiment 6

In Embodiment 6, S-BSM14 made by OHARA Co., Ltd was used as a base member. The refractive index thereof for the wavelength 650 nm was 1.6033. A graded layer having a refractive index structure shown in FIG. 26 was formed on the base member. $n_s$ was 1.530, $n_i$ was 1.0, and $t_i$ was 500 nm.

Figure 27:
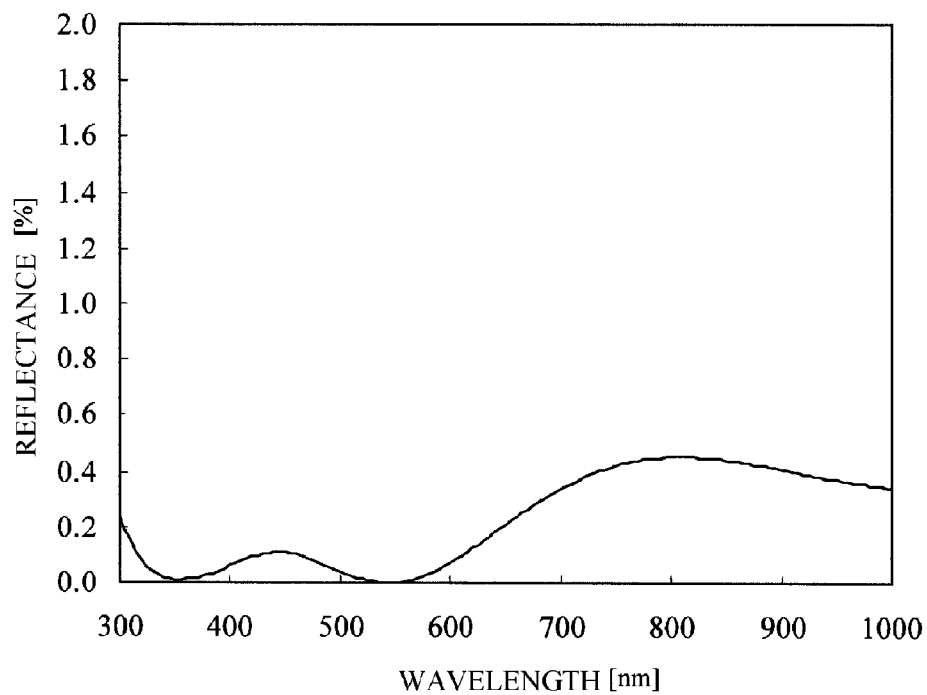
FIG. 27 shows a reflectance characteristic of Embodiment 6.

From the expression (1), $n_t$ was 1.053, and the value of the expression (2) was 0.51. FIG. 27 shows the reflectance characteristic of Embodiment 6. The reflectance characteristic included two minimum values, and a low reflectance of 0.4% or less was achieved in the entire visible wavelength range.

Comparative Example 1

Figure 19:
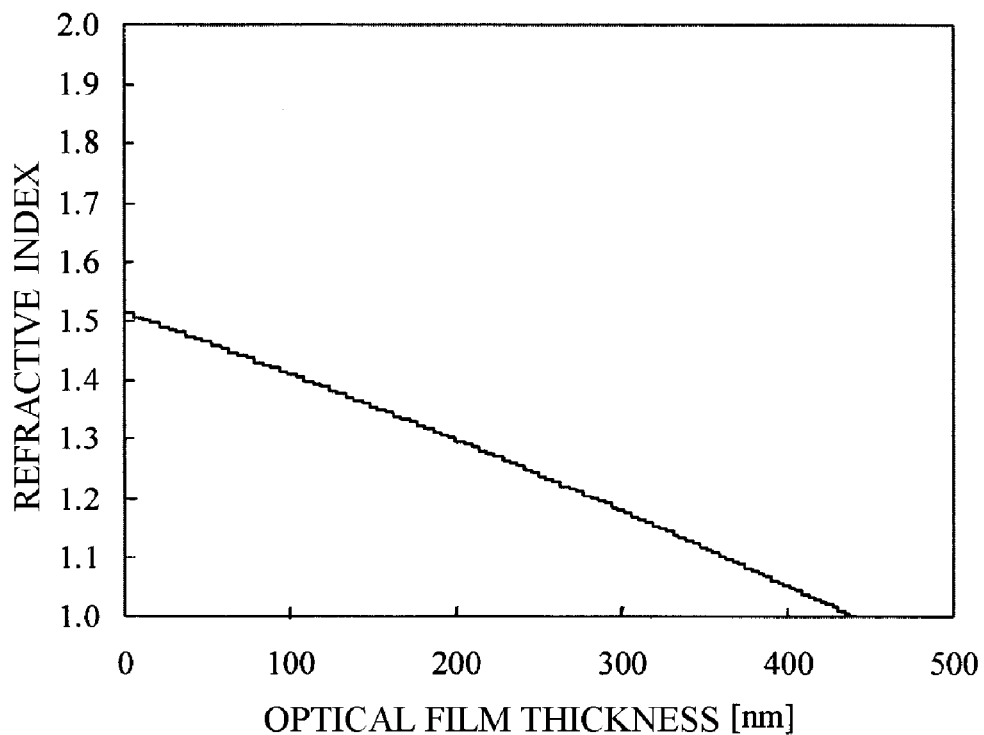
FIG. 19 shows a refractive index structure of a graded layer of Comparative Example 1.

In Comparative Example 1, S-BSM14 made by OHARA Co., Ltd was used as a base member. The refractive index thereof for the wavelength 550 nm was 1.6088. A graded layer having a refractive index structure shown in FIG. 19 was formed on the base member. $n_s$ was 1.51, $n_i$ was 1.0, and $t_i$ was 440 nm. The graded layer shown in FIG. 19 was formed into a film whose refractive index linearly changes with respect to its physical film thickness.

Figure 20:
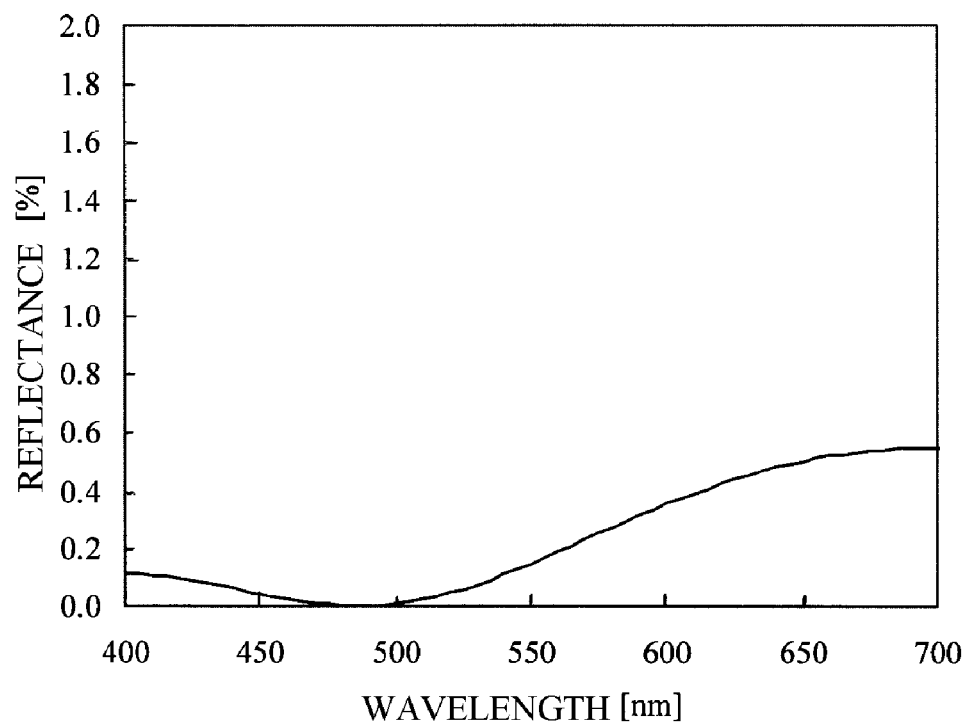
FIG. 20 shows a reflectance characteristic of Comparative Example 1.

From the expression (1), $n_t$ was 1.051. The value of the expression (2) was 1.19, which does not satisfy the condition of the expression (2). FIG. 20 shows the reflectance characteristic of Comparative Example 1. Comparative Example 1 is inferior in the broadband characteristic as compared with Embodiment 1.

Comparative Example 2

Figure 21:
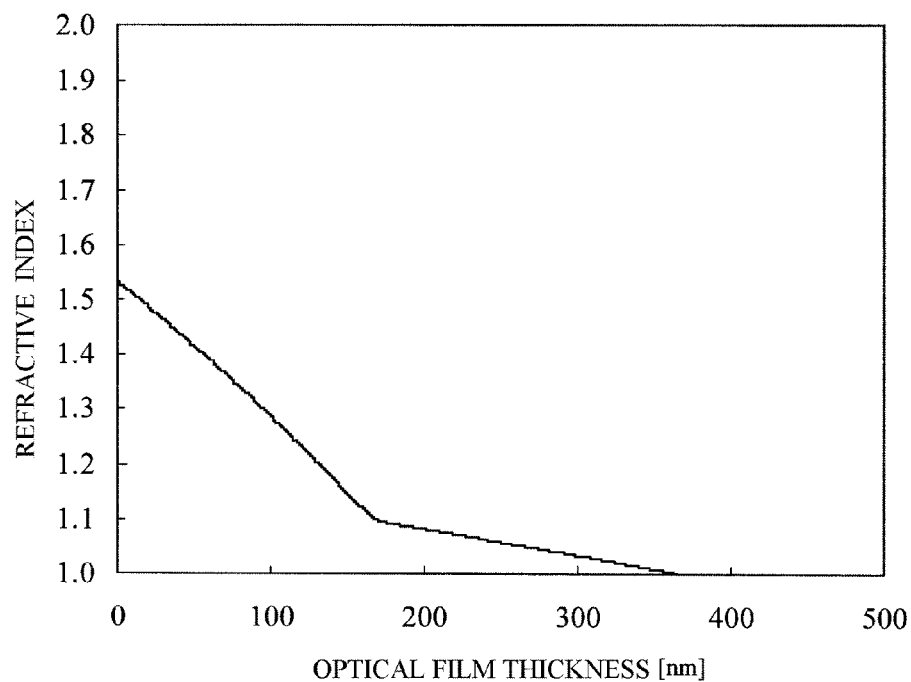
FIG. 21 shows a refractive index structure of a graded layer of Comparative Example 2.

In Comparative Example 2, S-BSM14 made by OHARA Co., Ltd was used as a base member. The refractive index thereof for the wavelength 650 nm was 1.6033. A graded layer having a refractive index structure shown in FIG. 21 was formed on the base member. $n_s$ was 1.53, $n_i$ was 1.0, and $t_i$ was 350 nm.

Figure 22:
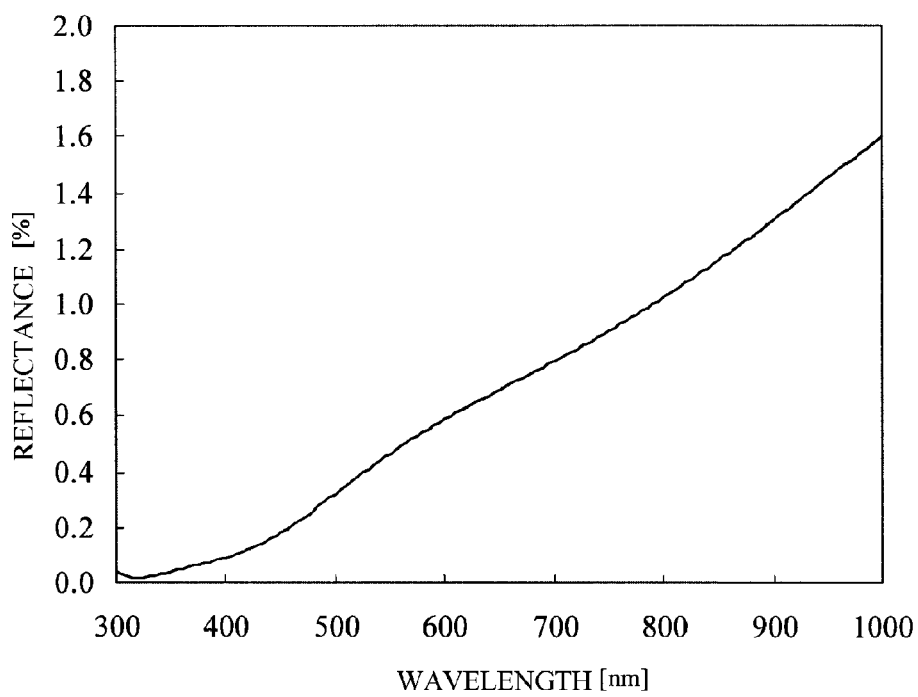
FIG. 22 shows a reflectance characteristic of Comparative example 2.

From the expression (1), $n_t$ was 1.053. The value of the expression (2) was 0.48, which does not satisfy the condition of the expression (2). FIG. 22 shows the reflectance characteristic of Comparative Example 2. Comparative Example 2 shows that its reflectance characteristic greatly changes as compared with Embodiment 1 even though the optical film thickness of Comparative Example 2 is equal to that of Embodiment 1.

Comparative Example 3

Figure 28:
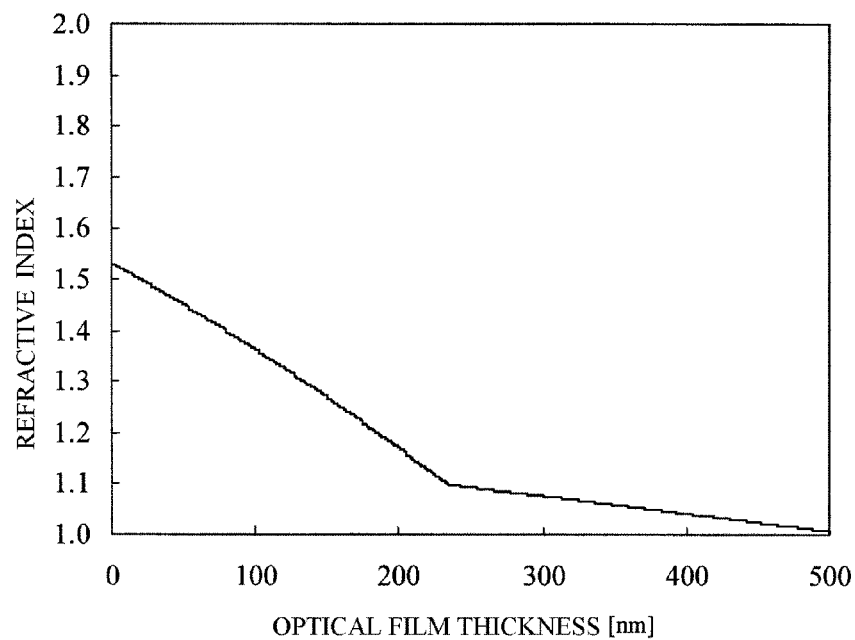
FIG. 28 shows a refractive index structure of a graded layer of Comparative Example 3.

In Comparative Example 3, S-BSM14 made by OHARA Co., Ltd was used as a base member. The refractive index thereof for the wavelength 650 nm was 1.6033. A graded layer having a refractive index structure shown in FIG. 28 was formed on the base member. $n_s$ was 1.53, $n_i$ was 1.0, and $t_i$ was 500 nm.

Figure 29:
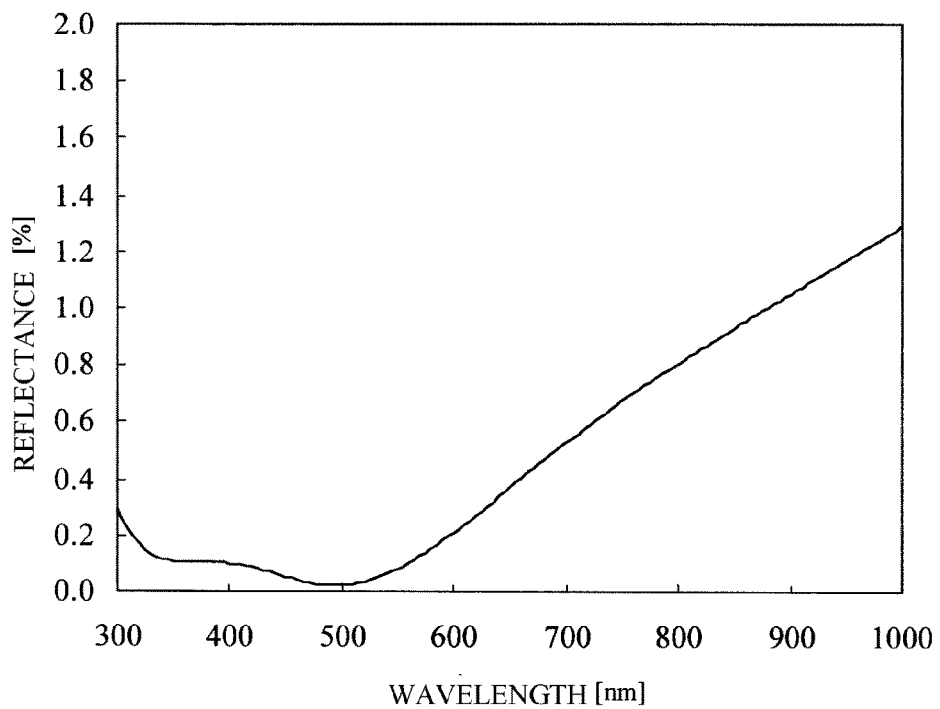
FIG. 29 shows a reflectance characteristic of Comparative Example 3.

From the expression (1), $n_t$ was 1.053. The value of the expression (2) was 0.48, which does not satisfy the condition of the expression (2). FIG. 29 shows the reflectance characteristic of Comparative Example 3. Comparative Example 3 shows that its reflectance characteristic greatly changes as compared with Embodiment 1 even though the optical film thickness of Comparative Example 3 is equal to that of Embodiment 1.

Table 1 collectively shows numerical values of Embodiments 1 to 6, and Table 2 collectively shows numerical values of Comparative Examples 1 to 3.

TABLE 1

|  |  | EMBODIMENT 1 | EMBODIMENT 2 | EMBODIMENT 3 | EMBODIMENT 4 | EMBODIMENT 5 | EMBODIMENT 6 |
|---|---|---|---|---|---|---|---|
| GRADED LAYER | $n_s$ | 1.530 | 1.380 | 1.390 | 1.530 | 1.530 | 1.530 |
|  | $n_i$ | 1.000 | 1.000 | 1.000 | 1.000 | 1.000 | 1.000 |
|  | $t_i$ [nm] | 350 | 485 | 250 | 350 | 350 | 500 |
| OPTICAL INTERFERENCE LAYER | REFRACTIVE INDEX | — | 1.500 | 1.560 | — | — | — |
|  | OPTICAL FILM THICKNESS [nm] | — | 113 | 105 | — | — | — |
| BASE MEMBER | GLASS | S-BSM14 | S-BSM14 | S-LAH55 | S-BSM14 | S-BSM14 | S-BSM14 |
|  | REFRACTIVE INDEX | 1.6033 | 1.6088 | 1.8390 | 1.6033 | 1.6033 | 1.6033 |
| $\lambda$ [nm] |  | 650 | 550 | 550 | 650 | 650 | 650 |
| $n_t$ |  | 1.05 | 1.04 | 1.04 | 1.05 | 1.05 | 1.05 |
| $t(n_t)$ | [nm] | 304 | 262 | 205 | 304 | 349 | 428 |
|  | $\lambda$ | 0.47$\lambda$ | 0.48$\lambda$ | 0.37$\lambda$ | 0.47$\lambda$ | 0.54$\lambda$ | 0.66$\lambda$ |
| $n\{t(n_t)\}$ |  | 1.25 | 1.15 | 1.16 | 1.22 | 1.26 | 1.22 |
| CONDITION (2) |  | 0.72 | 0.50 | 0.53 | 0.51 | 0.78 | 0.51 |

TABLE 2

|  |  | COMPARATIVE EXAMPLE 1 | COMPARATIVE EXAMPLE 2 | COMPARATIVE EXAMPLE 3 |
|---|---|---|---|---|
| GRADED LAYER | $n_s$ | 1.511 | 1.530 | 1.530 |
|  | $n_i$ | 1.000 | 1.000 | 1.000 |
|  | $t_i$ [nm] | 440 | 350 | 500 |
| OPTICAL INTERFERENCE LAYER | REFRACTIVE INDEX | — | — | — |
|  | OPTICAL FILM THICKNESS [nm] | — | — | — |
| BASE MEMBER | GLASS | S-BSM14 | S-BSM14 | S-BSM14 |
|  | REFRACTIVE INDEX | 1.6088 | 1.6033 | 1.6033 |
|  | $\lambda$ [nm] | 550 | 650 | 650 |
|  | $n_t$ | 1.05 | 1.05 | 1.05 |
| $t(n_t)$ | [nm] | 201 | 308 | 370 |
|  | $\lambda$ | 0.36$\lambda$ | 0.47$\lambda$ | 0.57$\lambda$ |
|  | $n\{t(n_t)\}$ | 1.30 | 1.20 | 1.20 |
|  | CONDITION (2) | 1.19 | 0.48 | 0.48 |

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2008-222900, filed on Aug. 29, 2008, which is hereby incorporated by reference herein in its entirety.

What is claimed is:

1. An optical element comprising:
a base member; and
a first layer which is formed on the base member and whose refractive index for a central use wavelength $\lambda$ changes in a direction of a thickness of the first layer by 0.05 or more, wherein the first layer has an anti-reflection function and satisfies the following conditions:

$$n_t = n_i + 0.1 \cdot (n_s - n_i)$$

$$0.5 \leq \frac{n\{t(n_t)/2\} - n_t}{n_s - n\{t(n_t)/2\}} \leq 0.8$$

$$\frac{\lambda}{4} \leq t(n_t) \leq 2\lambda$$

$$1.0 \leq n_i \leq 1.1$$

where $n_i$ represents a refractive index of a most light entrance side part of the first layer for the central use wavelength, $n_s$ represents a refractive index of a most base member side part of the first layer for the central use wavelength, $t(n_t)$ represents an optical film thickness of the first layer at which the refractive index thereof for the central use wavelength is $n_t$, and $n\{t(n_t)/2\}$ represents a refractive index of the first layer for the central use wavelength at a position where the optical film thickness is $t(n_t)/2$.

2. The optical element according to claim 1, wherein at least one optical interference layer is formed between the base member and the first layer.

3. The optical element according to claim 2, wherein a refractive index of at least one of the optical interference layer for the central use wavelength is between a refractive index of the base member and $n_s$.

4. The optical element according to claim 1, wherein the refractive index of the first layer changes more gently on a light entrance side than on a base member side.

5. The optical element according to claim 1, wherein the first layer is formed by plural structure portions each smaller than the central use wavelength.

6. An optical apparatus comprising:
an optical element which comprises:
a base member; and
a first layer which is formed on the base member and whose refractive index for a central use wavelength $\lambda$ changes in a direction of a thickness of the first layer by 0.05 or more,
wherein the first layer has an anti-reflection function and satisfies the following conditions:

$$n_t = n_i + 0.1 \cdot (n_s - n_i)$$

$$0.5 \leq \frac{n\{t(n_t)/2\} - n_t}{n_s - n\{t(n_t)/2\}} \leq 0.8$$

$$\frac{\lambda}{4} \leq t(n_t) \leq 2\lambda$$

$$1.0 \leq n_i \leq 1.1$$

where $n_i$ represents a refractive index of a most light entrance side part of the first layer for the central use wavelength, $n_s$ represents a refractive index of a most base member side part of the first layer for the central use wavelength, $t(n_t)$ represents an optical film thickness of the first layer at which the refractive index thereof for the central use wavelength is $n_t$, and $n\{t(n_t)/2\}$ represents a refractive index of the first layer for the central use wavelength at a position where the optical film thickness is $t(n_t)/2$.

* * * * *